Sept. 4, 1928.
D. COHELAN
1,683,529
AUTOMOBILE BATTERY
Filed Oct. 24, 1927
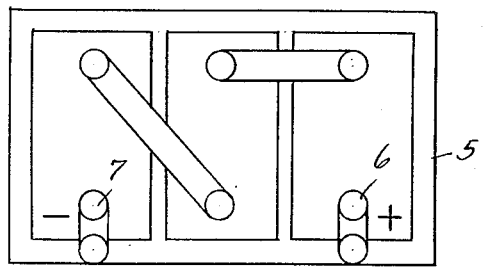
Fig. I.
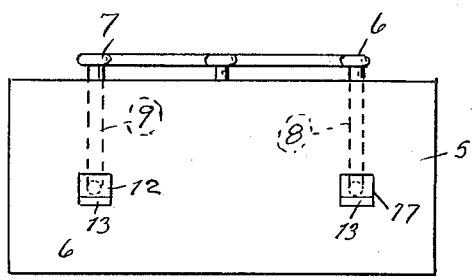
Fig. II.
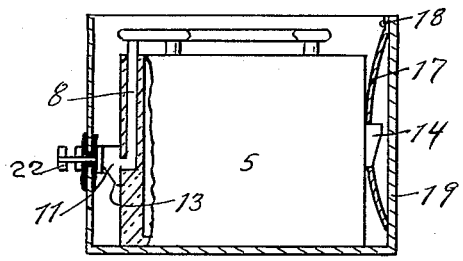
Fig. III.
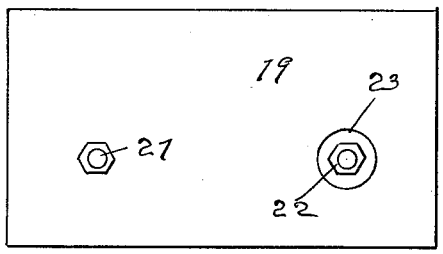
Fig. IV.
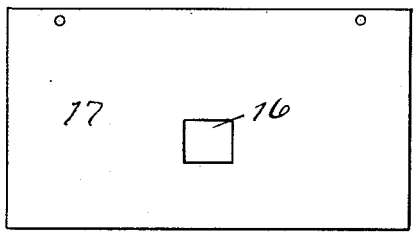
Fig. V.
INVENTOR.
D. COHELAN
BY *Victor J. Evans*
ATTORNEY.

Patented Sept. 4, 1928.

1,683,529

UNITED STATES PATENT OFFICE.

DANIEL COHELAN, OF SAN FRANCISCO, CALIFORNIA.

AUTOMOBILE BATTERY.

Application filed October 24, 1927. Serial No. 228,448.

This invention relates to improvements in batteries and has particular reference to a battery such as is commonly employed in automobiles and the like.

The principal object of this invention is to provide means whereby the corrosion incident to gases forming in the battery, which corrosion works over the terminals and causes poor connections, many times eating off the connecting wires is prevented.

Another object of this invention is to produce a device which may be economically manufactured and one which may be applied to the standard form of automobile without altering the construction of the same.

A further object is to produce a device wherein the battery may be readily removed or inserted in the container without disturbing any connections.

A still further object is to produce a device which maintains the battery against movement.

Other objects and advantages will be apparent during the course of the following description.

In the accompanying drawings forming a part of this specification and in which like numerals are employed to designate like parts throughout the same, Figure 1 is a top plan view of a storage battery constructed in accordance with my invention, Figure 2 is a front elevation of Figure 1 showing the terminals of the battery positioned upon the side of the battery case, Figure 3 is a cross section of a battery box having my battery positioned therein and partly broken away to better illustrate the same, Figure 4 is a front elevation of a battery case, and Figure 5 is a front elevation of the case spring.

In order to eliminate the customary corrosion incident to battery construction which corrosion often takes place causing the wires to be eaten away to such a point that the connections will no longer carry the current, I have produced a battery wherein the terminals have been removed from the top of the battery which is the point that the corrosion takes place due to the rising gases and have moved these terminals downwardly and positioned them upon the sides of the battery box in a novel manner.

I have also provided a case for the battery having contacts positioned therein and means for maintaining the battery within its case.

In the accompanying drawings wherein for the purpose of illustration is shown a preferred embodiment of my invention the numeral 5 designates the customary battery case which is usually made of rubber or similar insulating composition. This battery case serves to house one or more cells from which cell a positive and a negative extend. These terminals are designated at 6 and 7 respectively. The construction thus far described is common to all storage batteries.

My battery differs in that mounted within the battery case are downwardly extending conductors 8 and 9 which have their lower extremities connected to contacts 11 and 12 respectively, and it will be noted by viewing Figure 3 that the bottom of each of these contacts is provided with a cam surface 13. The upper extremity of these conductors 8 and 9 are connected to the terminals 6 and 7 respectively. Formed upon the back of the battery case is a lug 14 which lug is adapted to enter an opening 16 formed in a spring plate 17. This spring plate is connected by rivets 18 to a metallic battery case 19. This battery case carries upon its front face, terminals 21 and 22. The terminal 21 is connected directly to the battery case and may therefore be termed the ground. The terminal 22 is insulated from the battery case as shown at 23, therefore if a battery constructed in accordance with my invention is to be employed with a motor vehicle it is first necessary to place one of my battery cases in the vehicle and to connect the terminals 21 and 22 with the wiring of the car in the usual manner.

By now inserting a battery, constructed in accordance with my invention, into the battery case the same will pass downwardly into the box, the contacts 11 and 12 will engage the terminals 21 and 22 at the same time the lug 14 will engage the opening in the plate 17 which will prevent the battery from being accidentally withdrawn. At the same time the spring plate 17 will maintain intimate contact between the contacts beforementioned.

It will thus be seen that I have produced a very simple and efficient device and one which will perform all of the objects above set forth. It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In combination with a storage battery and a case therefor, of terminals positioned on said case and located at a point below the upper surface thereof, means for conducting electric current from said battery to said terminals, a metallic case surrounding the sides and bottom of said battery case, contacts positioned in said metallic case and adapted to be engaged by said terminals, one of said contacts being insulated from said metallic case, a plate positioned within said metallic case, said plate having an opening formed therein, a lug carried on said battery case and adapted to project through the opening in said plate, said plate being curved in a direction so as to cause said terminals to engage said contacts for the purpose specified.

In testimony whereof I affix my signature.

DANIEL COHELAN.